C. E. ANDERSON.
AUTOMATIC RELEASE CLUTCH.
APPLICATION FILED DEC. 9, 1914.

1,177,674.

Patented Apr. 4, 1916.

Witnesses:

Inventor:
Charles E. Anderson
Attorneys.

UNITED STATES PATENT OFFICE.

CHARLES E. ANDERSON, OF RACINE, WISCONSIN.

AUTOMATIC-RELEASE CLUTCH.

1,177,674.  Specification of Letters Patent.  Patented Apr. 4, 1916.

Application filed December 9, 1914.  Serial No. 876,198.

*To all whom it may concern:*

Be it known that I, CHARLES E. ANDERSON, a citizen of the United States, and resident of Racine, in the county of Racine and State of Wisconsin, have invented certain new and useful Improvements in Automatic-Release Clutches; and I do hereby declare that the following is a full, clear, and exact description thereof.

My invention has for its object to provide a simple, economical and effective automatic release clutch especially applicable to starting mechanism for internal combustion engines whereby damage incidental to back fire is eliminated.

With the above object in view the invention consists in certain peculiarities of construction and combination of parts as set forth hereinafter with reference to the accompanying drawings and subsequently claimed.

Figure 1:
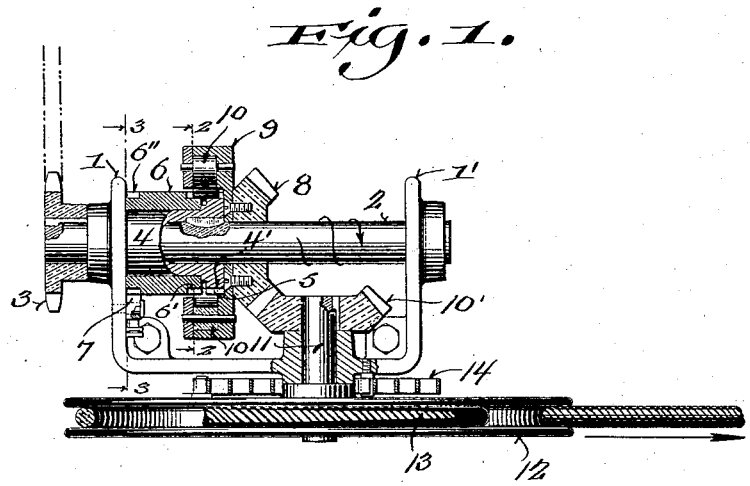
Figures 2, 3:
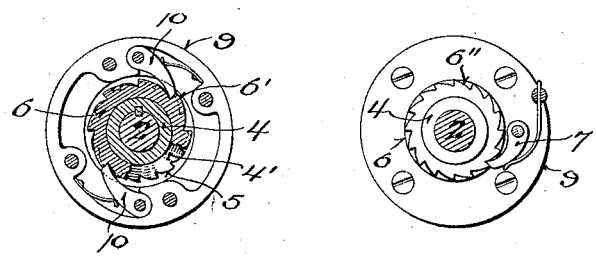

In the drawings, Figure 1 represents an elevation of a clutch mechanism embodying the features of my invention, the same being partly in section to more clearly illustrate the details of construction, and Figs. 2 and 3, cross-sections of the same, the sections being respectively indicated by lines 2—2 and 3—3 of Fig. 1.

In the accompanying exemplification of my invention, the same is shown in connection with a clutch mechanism for cranking internal combustion engines, it being understood, however, that the said mechanism may be employed for any purpose other than that mentioned.

In the accompanying illustrations, 1, 1', represent the arms of a bracket provided with bearings for a shaft 2, which shaft has fast upon one end a sprocket-wheel 3 outside of the arm 1. Upon the inside of said arm the shaft has secured thereto the hub 4 of a wheel 4', which wheel is provided with a series of annular ratchet teeth 5. Loosely mounted upon the hub 4 is a ring 6, which ring is approximately the same diameter as the wheel 4' and one edge of the same is arranged in close relation to the teeth of the latter, the said edge being provided with companion ratchet teeth 6' which are adapted to register or aline with the ratchet teeth 5. The opposite end of the ring 6 is provided with a second series of ratchet teeth 6'', which ratchet-teeth are engaged by a spring-controlled dog 7 that is fixedly mounted upon the arm 1 of the bracket. The three sets of ratchet teeth just mentioned are each extended in the same direction and the series of teeth 6' which are related to the wheel series 5 are in number equal only to half the amount of the wheel series mentioned. Thus, as shown in Fig. 2, the indentures of the companion sets register alternately with relation to each other.

Loosely mounted upon the shaft 2 is a gear-wheel 8, which gear wheel has fast thereto a chambered hub 9 that overhangs the companion series of ratchet teeth 5 and 6' of the respective clutch members 4' and 6. The chambered hub 9 has pivotally mounted therein a pair of spring-controlled locking dogs 10, which dogs are of sufficient width to simultaneously engage a companion set of the two series of ratchet teeth 5 and 6'. The gear-wheel 8 meshes with a corresponding gear-wheel 10', which gear-wheel is carried by an arbor 11 that is journaled in a box forming part of the bracket member. The outer end of the arbor 11 carries a spring-controlled sheave or drum 12 and about the periphery of the same is secured one end of a runner or cable 13. This runner or cable is designed to impart motion to the arbor 11 in opposition to a coiled spring 14 which connects the drum and bracket member.

From the foregoing description it will be seen that when the parts are in their normal condition, as shown in the drawings, motion from the arbor is transmitted to the shaft 2 in the direction as indicated by the arrow due to the fact that the beveled gear-wheel 8 is clutched to said shaft through the clutch members previously mentioned. Hence said motion is transmitted to the engine shaft, not shown, through the sprocket-gear 3 by a suitable belt, as indicated in dotted lines. Should back fire occur, whereby a reverse movement of the shaft 2 will result, it is obvious that the pawl 7 will lock the ring 6 against rotation in this reverse direction and a slight continued movement of the gear-wheel 8 in said reverse direction will cause the dogs 10 to be cammed from their engagement with the ratchet teeth 5, whereby said wheel is freed from its locking connection with the shaft. Thus the shaft will be free to race in a reverse direction without any detrimental effects upon the gear mechanism shown, which result is produced by holding the ring in the travel of the wheel 4' through a distance approximating the space of one tooth, it is obvious that the pawls will be promptly released.

I claim:

A starter device for internal combustion engine comprising a bracket provided with outstanding spaced parallel arms, a shaft journaled in the arms, a wheel having a hub fast on the shaft, the wheel being provided with ratchet-teeth, a ring loose on the hub and having one end abutting the wheel and provided with ratchet-teeth, the other end of the ring abutting one of the bracket arms and being provided with ratchet-teeth, a pawl carried by said bracket arm and engaging the last-mentioned ratchet-teeth to prevent reverse movement of the ring, a gear loose on the shaft and provided with a housing that incloses the wheel and the abutting portion of the ring, pawls carried by the housing and engaging the ratchet-teeth of the wheel and the adjacent ratchet-teeth of the ring to lock the gear to the shaft, an arbor journaled in the bracket, a gear fast on the arbor and in mesh with the gear of the shaft, and means for rotating the arbor.

In testimony that I claim the foregoing I have hereunto set my hand at Racine, in the county of Racine and State of Wisconsin, in the presence of two witnesses.

CHARLES E. ANDERSON.

Witnesses:
FRANK H. SHEFFIELD,
F. H. FOSTER.

Copies of this patent may be obtained for five cents each, by addressing the "Commissioner of Patents, Washington, D. C."